7515X
Bayha & Rapp.
Sausage Cutter.
Patented Apr. 8, 1833.
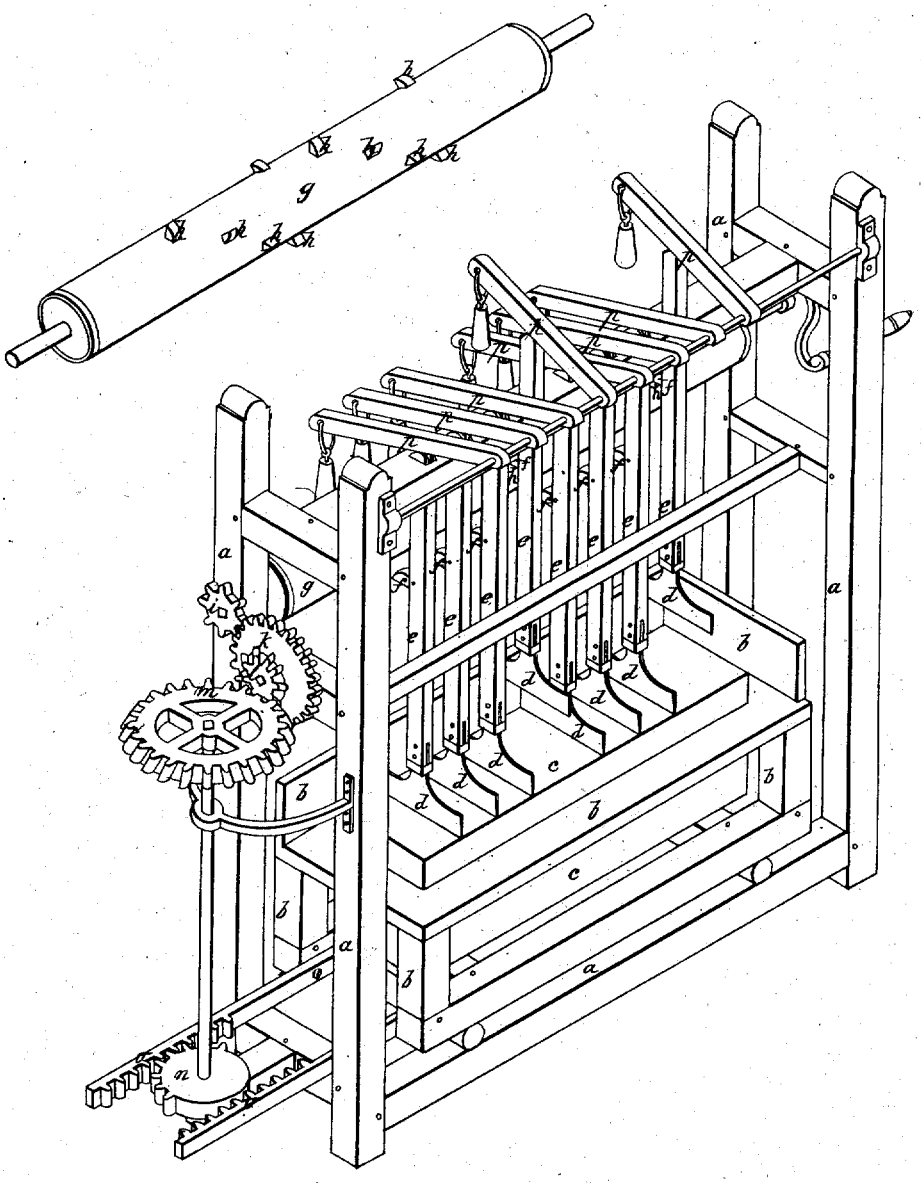
THE NORRIS PETERS CO., WASHINGTON, D. C.

7515X a. 13 Apl. 8, 1833

Louis Baypha and Frederick Rapp

Letters Patent

The Schedule referred to in these Letters Patent and making part of the same containing a description in the words of the said Louis Baypha and Frederick Rapp themselves of their improvement in the machine for cutting Sausage Meat.

Be it known that we Louis Baypha and Frederick Rapp of Wheeling Ohio County and State of Virginia have made an improvement in the machine for cutting Sausage Meat which is described as follows. This machine consists of a frame which supports the machinery and knives a carriage and block on which the meat is placed and cut. Knives for cutting the meat and the arms and levers by which they are worked. a cylinder containing projections which raise the knives. a cog wheel bevel wheel and pinion which move the rack and carriage. and a rack and segment wheel for moving the carriage — The frame is constructed by mortising and tenoning together [illegible] sills. four uprights. two girths and two cap pieces. from the top two arms project to receive the ends of the levers placed over the arms of the knives. also on the top is placed a rail having partitions in it through which the beforementioned levers work. This frame is about 6 feet high 6 feet long and 3 feet wide — The carriage and block The carriage is about 3 feet long 20 inches wide and 16 inches deep. The sides and ends are moveable and can be taken off. At one end of the carriage are two arms about 2½ feet long between which is placed the rack and segment wheel to be hereafter described
The block on which the meat is cut is about 2 feet 2 inches long 18 inches wide and 16 inches deep It is placed upon the carriage and when worn can be raised up and is about 4 inches above the [illegible] of the carriage. The carriage with the block

7515X are placed upon rollers resting on the sills of the frame
The Knives and arms & Levers for moving them. There may be from
four to sixteen knives more or less. each knife is about 13 inches long
and 6 inches deep made of the best steel with a sharp cutting edge
it is fastened by bolts or screws to an arm about 3½ feet or 4 feet
long. a peg or projection is put in each arm about 2 feet from
the knife it is made each to work through an opening in a
cross piece. A lever is placed over each arm and knife having
a weight on it for giving force to the knife. This lever turns on a
pivot placed on the frame. The knife is raised about 8 or 9
inches by the projections on the cylinder to be hereafter described
The cylinder containing the projections or pegs which work the knives
The Cylinder extends the length of the frame and about 6 or 8 inch
es diameter. It turns on gudgeons in the frame by means of a crank.
The rows of pegs are put upon this cylinder in a spiral direction so
that each knife will be raised three at each revolution of the cylin
der — 2 A Cog Wheel Bevel Wheel and Pinion. which move the
rack and carriage by two racks and segment wheel placed
between them. A pinion placed on the end of the cylinder turns
a cog wheel turning on gudgeons in the frame. This turns a mitre
wheel by a bevel wheel fixed on the same axle as the cog wheel.
The mitre wheel is fixed on an axle or shaft about 4 feet long. On
the lower end of this shaft is a segment cog wheel which works in
two racks one on each side and moves the carriage forward and
backward — Operation. The meat to be cut is placed on the
block in the carriage. motion is given to the cylinder by any conve=
nient power. the pegs on the cylinder give motion to the knives
by raising the arms. the weight on the levers placed over the arms
send them down with force. the pinion on the end of the cylinder
gives motion to the cog wheel. the bevel wheel on its axle gives mo
tion to the mitre wheel. this gives motion to the segment wheel
at the lower end of the shaft which works into the racks pla
ced on each side of it alternately which move the carriage

7515X forward and backward: and carry the meat forward. The
Invention here claimed and desired to be secured by letters patent
is the before described machine for cutting Sausage meat, particu-
ularly the cylinder with the pegs or projections placed [illegible]
for moving the arms, the levers and weights placed over the arms
and the segment wheel working the racks that move the carriage
forward and backward. For a further illustration of our
invention we refer to the model and drawing of the same depo-
sited in the Patent Office — In testimony whereof we have
subscribed our names before two witnesses this 22d day of
March 1833

Wm. McConnell } Witnesses
Anderson Seagrove }

Louis Bayka
Frederick Rapp

949 [illegible]

E. [illegible]
C.H.W.

(Patented April 8. 1833)
(Dr. in portfolio)